(12) United States Patent
Wang

(10) Patent No.: US 6,540,380 B2
(45) Date of Patent: Apr. 1, 2003

(54) ILLUMINATION SYSTEM FOR PROJECTOR

(75) Inventor: Chih-Yung Wang, Taoyan (TW)

(73) Assignee: Delta Electronics, Inc. (TW)

(*) Notice: Subject to any disclaimer, the term of this patent is extended or adjusted under 35 U.S.C. 154(b) by 24 days.

(21) Appl. No.: 09/818,872

(22) Filed: Mar. 26, 2001

(65) Prior Publication Data

US 2002/0109992 A1 Aug. 15, 2002

(30) Foreign Application Priority Data

Feb. 13, 2001 (TW) .................................... 90202189 U

(51) Int. Cl.[7] ............................. F21V 9/00; G02B 5/30
(52) U.S. Cl. .................. 362/293; 362/19; 362/321; 362/325; 359/486; 359/487; 359/495; 359/497; 353/20; 353/31; 353/34; 353/37
(58) Field of Search ...................... 362/293, 19, 330, 362/321, 325; 359/486, 487, 495, 496, 497; 353/20, 33, 34, 31, 37

(56) References Cited

U.S. PATENT DOCUMENTS 2,748,659 A * 6/1956 Geffcken et al. ............ 359/487
5,978,136 A * 11/1999 Ogawa et al. .............. 359/487

* cited by examiner

Primary Examiner—Sandra O'Shea
Assistant Examiner—Ronald E. DelGizzi
(74) Attorney, Agent, or Firm—Martine & Penilla, LLP

(57) ABSTRACT

An illumination system for a projector having a color management system (CMS). The illumination system comprises a light source, a light-converging system for converging light beams coming from the light source, a P-S converter and a gobo. The P-S converter is used for receiving and polarizing the light beams and then transmitting the light beams into the CMS. The gobo is formed with a plurality of apertures and is provided between the light converging system and the P-S converter.

11 Claims, 3 Drawing Sheets

ILLUMINATION SYSTEM FOR PROJECTOR

FIELD OF THE INVENTION

The invention relates to an illumination system for a projector, and more particularly, relates to an illumination system with a specific gobo for a projector.

BACKGROUND OF THE INVENTION

Projector is one of the essential apparatus in the office. At present, the popular LCD projector has become the main stream of the new type of projector. Generally speaking, the projector structure of the prior art is composed of three parts—an illumination system, a color management system (CMS) and a projection system. The illumination system includes a light source of a projection-type projector and a light-converging system. The CMS separates an incident light beam into a plurality of light beams each corresponding to a specific color or polarization state. Finally, the CMS combines all the light beams to transmit into the projection system. The projection system utilizes the incident light beam to project an image.

Generally speaking, the light distribution transmitted from a good light source has to be uniform; that is, its original light beams must be as parallel as possible, so as to reduce the stray light transmitted into the CMS. As far as the image effect of the prior art is concerned, since the stray light beams will seriously affect the color purity and contrast effect of the projection image in the projection system, these stray lights from the illumination system and the CMS are regarded as the key factor for determining the quality of the image projection. In the light of an LCD projector, the conventional light-converging system makes light distribution uniform and transforms the circular light distribution of the original light beam from the light source into a rectangular light distribution of an LCD panel. Currently, the common light-converging system includes a lens array that can change the light beams from a light source into a point light source array. In the meantime, this point light source array is superimposed and output to the CMS such that the light beams transmitted into the CMS possesses the characteristic of uniformity.

The illumination system of the present LCD projector needs to use a bulb with high wattage due to the demand of high illumination. The high illumination light source generates a large amount of heat in the color management system; thereby, it's apt to damage the optical components and LCD panels. As a result, the damage may shorten the life of the optical components, and the optical characteristic may be lowered accordingly.

FIG. 1 is a schematic view of the stray light beams generated by the wide-angle light beams according to the illumination system of the prior art of the projector. As shown in FIG. 1, the illumination system of the conventional projector includes a light source 10, two lens arrays 11 and 12 and a P-S converter 13. Besides, the conventional projector also includes a color management system 14, wherein a lens 141 receives light beams transmitted from the illumination system. The P-S converter polarizes the light beams output from the lens array 11 and 12, for instance, to transform the incident non-polarized light beam into a polarized light beam in S-state and output it to the color management system. Since the light beams originated from the light source is not completely parallel and have wide-angle components after being output from the lens array 11 and 12, they form stray light beams incident to the color management system 14 after passing through the P-S converter. Moreover, due to the imperfect focus of the lens array 11, the light beam output from the P-S converter 12 do not transform into an S-state polarization beam completely. An increase of non-parallel light beams may also deteriorate the condition that these non-S-state or non-P-state polarization beams are produced due to the incomplete polarization. The above-mentioned stray light beams are subjected to reflection and transmission for several times in the CMS system, and finally form a portion of projecting image. Consequently, the stray light beams greatly affect the chromatic purity and contrast effect of the projection image.

SUMMARY OF THE INVENTION

An object of the invention is to provide an illumination system for a projector that can overcome the disadvantage of excessive high illumination of the light source and enhance the contrast effect of the projection image. To attain this object, the invention provides an illumination system having a color management system (CMS). The illumination system includes a light source, a light-converging system, a P-S converter, and a gobo. The light-converging system is for converging the light beam coming from the light source. The P-S converter is for receiving and polarizing the light beams from the light-converging system and then transmitting the light beams into the CMS. The gobo is formed with a plurality of apertures and is provided between the light-converging system and the P-S converter. In this way, the gobo can diminish the stray light beam transmitting into the CMS. Moreover, the illumination system can prolong the service life of components and maintain the optical characteristic, and enhance the contrast effect of the projection image in the projector.

DETAILED DESCRIPTION OF THE PREFERRED EMBODIMENTS

Figure 1:
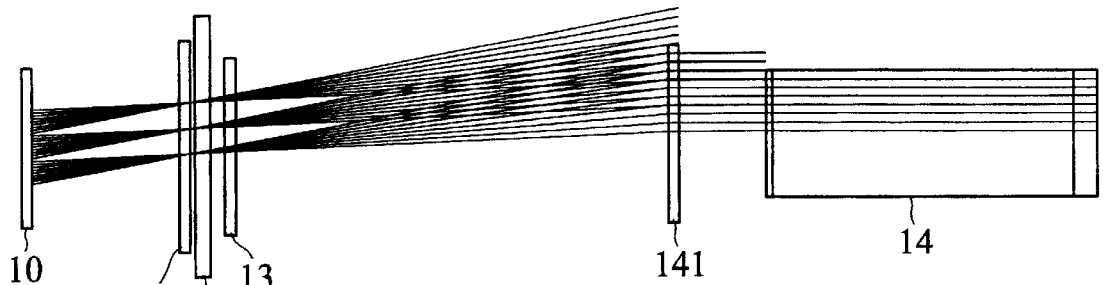
FIG. 1 is a schematic view of the stray light beams generated by wide-angle light beams of illumination system of the projector according to a prior art.
Figure 2:
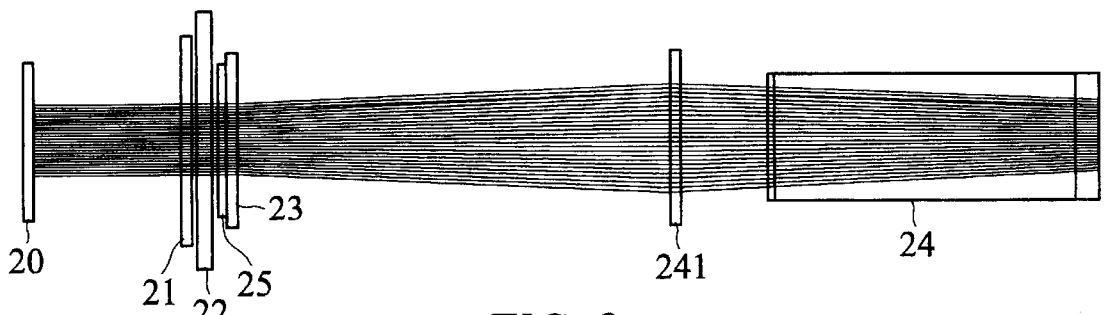
FIG. 2 is a schematic view showing how a gobo shields off the wide-angle light beams in accordance with an embodiment of the invention.
Figure 4A:
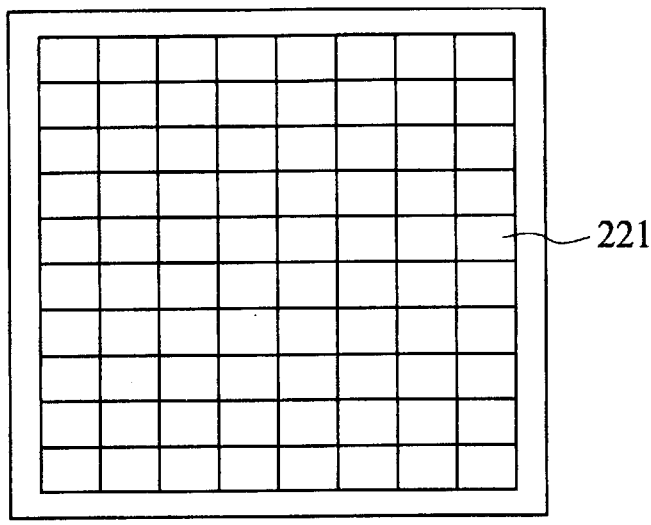
FIG. 4a is a schematic view showing a lens used in the illumination system in accordance with an embodiment of the invention.
Figure 4B:
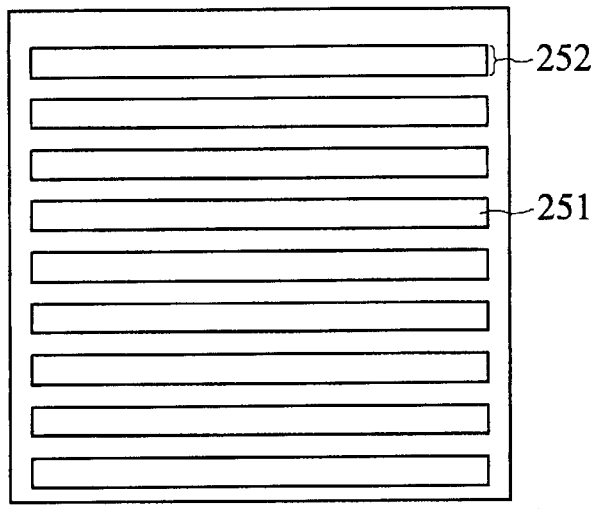
FIG. 4b is a schematic view showing a gobo disposed in the illumination system in association with the lens shown in FIG. 4a in accordance with an embodiment of the invention.

As shown in FIG. 2, the illumination system for a projector according to an embodiment of the invention includes a light source 20, a lens array 21 and 22, a P-S converter 23, and a gobo 25. The light source 20 and lens array 21 and 22 form a light-converging system of the illumination system. The light beam coming from the light source 20 travels through the lens array 21 and forms an image in front of the lens array 22. Moreover, the light beams travels through the lens array 22 to achieve the effect of light uniformity. Subsequently, the light beam, which is transformed after passing through the P-S converter 23, travels into the color management system (CMS) 24 of the projector. The gobo between the light-converging system and the P-S converter is formed with a plurality of apertures arranged regularly for shielding off the light beams transmitted into the P-S converter. As shown in FIG. 4b, a plurality of apertures which are strip-shaped openings having the same size are disposed in an array of equal pitch. As shown in FIG. 2, a part of the luminosity of the light beam forms wide-angle light beams due to the imperfect focus of the lens array. These wide-angle light beams are shielded off by the gobo 25 before transmitting into the CMS 24; thereby, the stray light beams from the lens 241 to the CMS are greatly reduced. Consequently, the above-mentioned object of lowering the luminosity of the light beams incident into the CMS 24 and reducing the stray light can be achieved.

Figure 3:
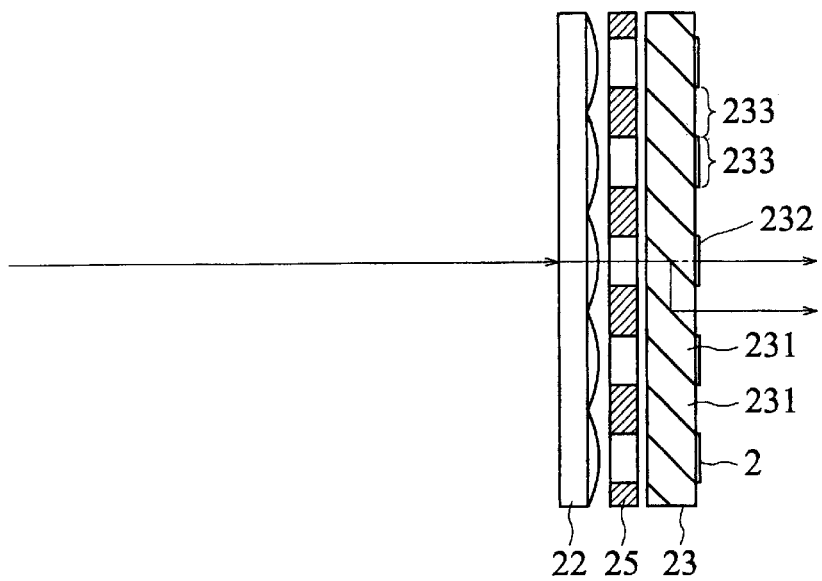
FIG. 3 is a schematic view showing a gobo disposed in an illumination system in accordance with an embodiment of the invention.

In addition to the above-mentioned effect, the purity of the polarizing light beam output from the P-S converter can be greatly improved since the gobo 25 can shield off the stray light in advance before the light beams passing through the P-S converter 23. As shown in FIG. 3, the P-S converter 23 includes a plurality of stacked polarizing beam-splitters (PBSs) 231 and a plurality of quarter-wave plates 232 spaced at intervals. Among them, a plate-shaped combination of the plurality of PBSs is formed by adjacently disposing each stripe-shaped PBSs, and the quarter-wave plates 232 which are spaced at intervals are disposed on the backside of the plate-shaped combination of PBSs. Based on such arrangement, the non-polarized light beams incident to P-S converter can be transformed into polarized light beams in S-state, and then transmitted into the CMS 24. Since most of the stray light beams have been shield off in advance by the gobo 25 before passing through the P-S converter 23, the incident angle of the light beam incident into the P-S converter 23 may not be excessively large. For this reason, the incomplete polarization resulted from the light leakage of the P-S converter 23 can be greatly reduced.

Moreover, it is preferable that the disposition of the apertures on the gobo 25 corresponds to the disposition of the lens units of the lens arrays 21 and 22. For instance, as shown in FIGS. 4a and 4b, since the lens arrays 21 and 22 are divided into a plurality of rectangular lens units 221, the apertures 251 of the gobo 25 are preferably stripe-shaped openings 251 with equal size and the same interval among each other.

As shown in FIG. 3 and FIG. 4b, in order to achieve the object of shielding off the light beam with large angle and lowering the luminosity of the incident light beam, preferably, the width 252 of the aperture 251 on the gobo 25 is greater than or equal to half of the interval 233 of each PBS 231 in the P-S converter 23. Besides, the preferred width 252 is half of the interval 233 so that the luminosity of the light beam incident to the CMS may not be too low.

Figure 4C:
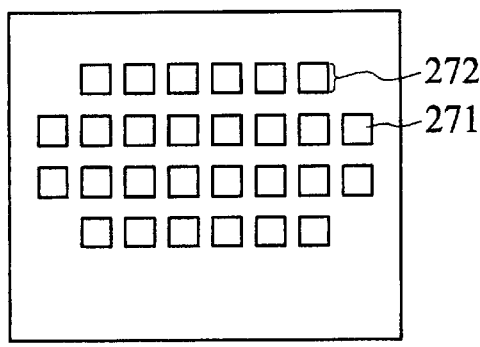
FIG. 4c is a schematic view showing another type of gobo disposed in the illumination system in accordance with an embodiment of the invention.

In addition to the above-mentioned gobo 25 with stripe-shaped aperture 251, another gobo 27 with another net-shaped apertures 271 as shown in FIG. 4C can be efficiently used due to its two-D disposition of apertures. Moreover, the longitudinal width 272 of the net-shaped aperture 271 possesses the same preferred condition as the width 252 of the stripe-shaped aperture 251.

Figure 5A:
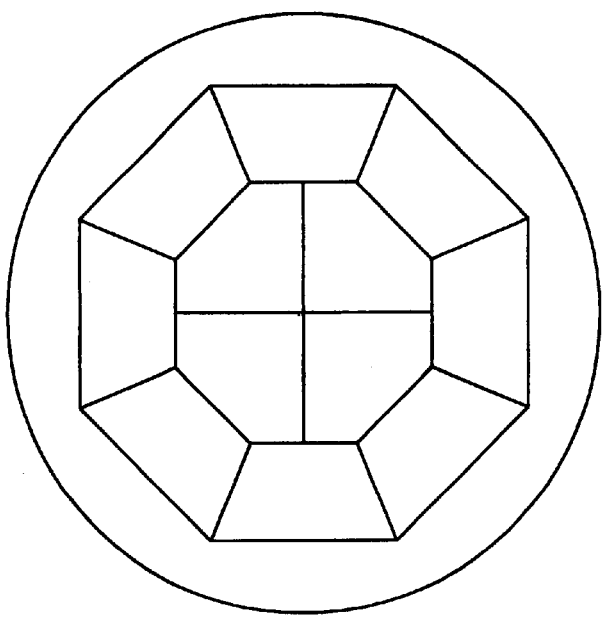
FIG. 5a is a schematic view showing a lens used in the illumination system in accordance with the other embodiment of the invention.
Figure 5B:
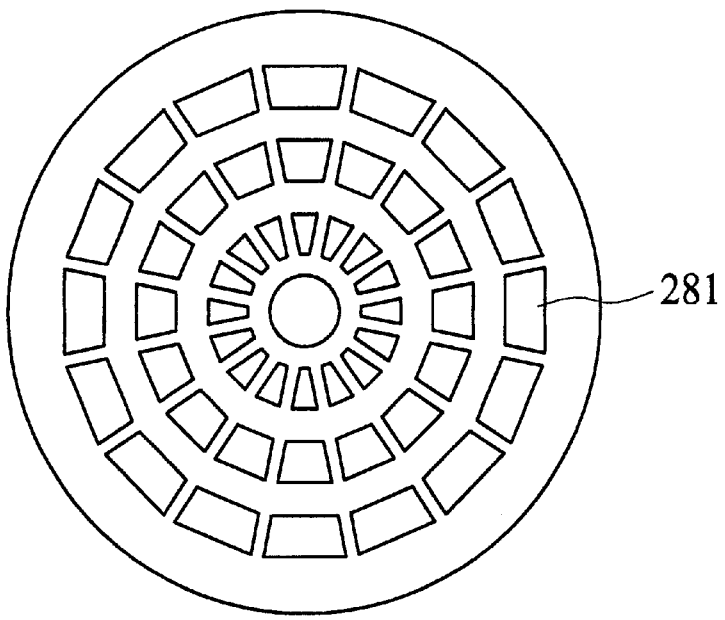
FIG. 5b is a schematic view showing a gobo disposed in the illumination system in association with the lens shown in FIG. 5a in accordance with the other embodiment of the invention.

According to another embodiment of the invention as shown in FIGS. 5a and 5b, the lens array 26 of an illumination system for a projector is formed with polygons. Similarly, the gobo 28 in accordance with this kind of lens array also has the disposition of concentric annular array of apertures 281.

It is known from the foregoing description that preferably the apertures of the gobo are arranged in accordance with the positions of the lens array units in the illumination system of a projector, so as to effectively achieve the object of shielding off the stray light. The apertures formed on the gobo of the invention are not limited to any specific type, and the appearance of the apertures of the embodiment depend on the type of lens array employed by the illumination system of a projector.

While the invention has been described by way of examples and in terms of a preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

What is claimed is:

1. An illumination system for a projector having a color management system (CMS), the illumination system comprising:
    a light source;
    a light-converging system for converging light beams coming from the light source;
    a P-S converter for receiving and polarizing the light beams from the light-converging system and then transmitting the light beams into the CMS; and
    a gobo with a plurality of apertures between the light converging system and the P-S converter.

2. The illumination system as claimed in claim 1, wherein the plurality of apertures are stripe-shaped openings having the same size and disposed in an array of equal pitch.

3. The illumination system as claimed in claim 1, wherein the plurality of apertures are rectangular openings having the same size and disposed in an array of equal pitch.

4. The illumination system as claimed in claim 1, wherein the plurality of apertures are disposed in a concentric array having the same size and equal pitch of polygonal openings.

5. The illumination system as claimed in claim 1, wherein each of the plurality of apertures has a width greater than or equal to half pitch of the P-S converters.

6. The illumination system as claimed in claim 1, wherein the light-converging system further comprises at least two sets of lens arrays disposed one after another along the light path.

7. The illumination system as claimed in claim 6, wherein the plurality of apertures are formed on the gobo corresponding to the lens arrays.

8. The illumination system as claimed in claim 1, wherein the P-S converter further comprises a combination of a plurality of polarization beam splitters (PBSs) disposed on the light path and a plurality of quarter-wave plates.

9. The illumination system as claimed in claim 8, wherein each of the plurality of PBSs is stripe-shaped.

10. The illumination system as claimed in claim 8, wherein the combination of the plurality of PBSs is formed by adjacently disposing the PBSs into a plate-shaped combination.

11. The illumination system as claimed in claim 8, wherein the plurality of quarter-wave plates are spaced at intervals and disposed on one side of the polarization beam splitters.

* * * * *